UNITED STATES PATENT OFFICE.

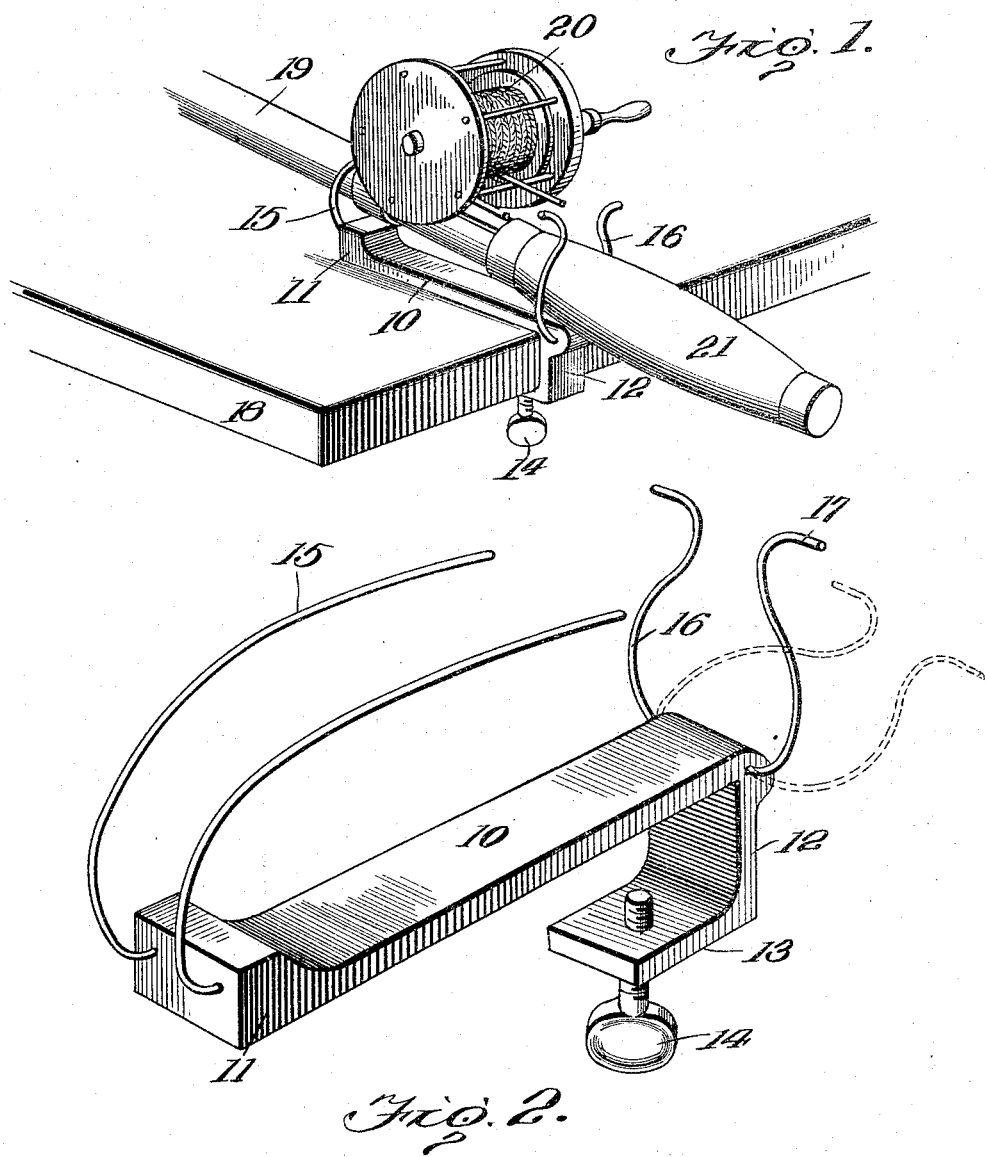

JOHN H. PORTER, OF JACKSON, MICHIGAN.

HOLDER FOR FISHING-POLES.

1,192,112.

Specification of Letters Patent.

Patented July 25, 1916.

Application filed June 5, 1915. Serial No. 32,441.

*To all whom it may concern:*

Be it known that I, JOHN H. PORTER, a citizen of the United States, residing at Jackson, in the county of Jackson and State of Michigan, have invented certain new and useful Improvements in Holders for Fishing-Poles, of which the following is a specification.

This invention contemplates an improved holder for fishing poles and has as its primary object to provide a device of this character which may be readily attached to the seat of a boat and adapted to operatively support the pole for trolling purposes.

The invention has as a further object to provide a device of this character adapted to coöperate with the reel to provide a braking means therefor. And the invention has as a still further object to provide a device of this character which will be simple in construction and wherein any conventional type of fishing pole may be readily attached to or detached therefrom.

Other and incidental objects will appear as the description proceeds and in the drawings wherein I have illustrated the preferred embodiment of the invention and wherein similar reference characters designate corresponding parts throughout the several views, Figure 1 is a perspective view showing the manner in which my improved device is employed in use, a conventional type of fishing pole and reel being shown in position thereon, Fig. 2 is a perspective view showing the device detached.

Referring now more particularly to the drawings, it will be seen that my improved holder includes an oblong body portion 10 which, at one extremity, is enlarged to provide a head 11 and at its opposite extremity is formed with a laterally extending leg 12. Formed on the leg 12 at its free end, is a laterally extending flange 13 which projects toward the head 11 in spaced parallel relation to the body portion 10. Mounted upon the flange 13 and adjustable thereon toward or away from the body portion 10 is a set screw 14. Mounted upon the head 11 are spaced longitudinally curved arms 15. These arms are each preferably formed from a length of suitable resilient wire embedded at one end within the end of the head. It will be noted that the arms are disposed in a plane with the body portion 10 and curve rearwardly thereover toward the inner end of the body portion. Preferably, the arms 15 extend throughout the major portion of the length of the body portion and are spaced therefrom in the manner best shown in Fig. 2 of the drawings.

Swingingly connected to the body portion 10 at the inner extremity thereof is a substantially U-shaped holding member or clip 16. This clip is also preferably formed from a single length of suitable resilient wire bent intermediate its ends to define spaced longitudinally curved arms which converge toward their free ends and are then again rebent to provide outstanding terminals or lugs 17. The body portion 10 is, at its inner extremity, provided with a transversely extending opening and the bight portion of the clip is freely received therein, the clip being thus adapted for movement to assume the position shown in dotted lines in Fig. 2 of the drawings.

In Fig. 1, I have shown the manner in which my improved device is employed in use and for this purpose, have conventionally illustrated a boat seat at 18. The device is positioned upon the seat with the body portion 10 seating upon the upper face thereof and with the flange 13 engaging beneath the seat, when the set screw 14 may then be operated to engage the seat for securely holding the device in place. The fishing pole conventionally shown at 19 is then disposed between the arms 15 with the said arms extending beneath the reel of the pole conventionally shown at 20 in the manner illustrated and with the handle 21 of the pole resting against the body portion 10 adjacent the inner end thereof. The clip 16 is then swung from the position shown in dotted lines in Fig. 2 of the drawings to a position embracing the handle 21, the arms of the clip being adapted to yieldably engage the handle for securely connecting the pole with the device. In this connection, it will be observed that the clip 16 may be readily operated by grasping the terminals 17 thereof. When the pole is thus disposed in position, the outer free end thereof will be arranged to project over one side of the boat and the pole will thus be operatively supported for trolling or other purposes, while the operator will be left free to propel the boat. Particular attention is now directed to the fact that the weight of the pole will urge the reel toward the arms 15 which are adapted to yieldably support the outer free end of the pole so that in use, the line upon the reel will thus be brought into frictional engagement with the arms. Thus, under ordinary circumstances, the arms 15 will be adapted to coact with the line upon the reel to provide a brake therefor while any downward pull upon the outer end of the pole such as would be caused by a fish pulling upon the line will tend to further urge the reel toward the arms 15 so that the said arms will be brought into more severe frictional engagement with the line upon the reel and the braking action thereof proportionately increased.

It will therefore be seen that I provide a very simple and efficient construction for the purpose set forth. Any conventional type of fishing pole may be readily attached to or detached from the device while the possibility of accidental breaking of the pole, in use, will be reduced to a minimum owing to the fact that the arms 15 of the device are adapted to yieldably support the outer end of the pole and are adapted to absorb any sudden shock upon the pole such as would be incident to the strike of a large fish. Furthermore, since the pole is disposed between the arms, the said arms are adapted to prevent any lateral shifting movement of the pole relative to the device.

Having thus described my invention, what I claim and desire to secure by Letters Patent is:—

1. A device of the character described including a body portion, an arm carried thereby, and a holding member mounted upon the body portion, said arm being adapted to engage a reel to operatively coöperate therewith with a pole supporting the reel engaged by said holding member.

2. A device of the character described including a body portion, spaced arms carried thereby, and a holding member mounted upon the body portion, said arms being adapted to engage a reel rested thereon with a pole supporting the reel disposed between the arms and engaged by said holding member with the arms adapted to hold the pole against lateral shifting movement.

3. A device of the character described including a body portion, an arm carried by the body portion, and a holding member mounted upon the body portion, the arm being adapted to engage a reel to coact with a line upon the reel whereby to provide a brake for the reel with a pole supporting the reel engaged by said holding member.

4. A device of the character described including a body portion, spaced yieldable arms carried thereby and extending above the body portion in spaced relation thereto, and a holding member carried by the body portion, said arms being adapted to engage a reel having a line wound thereon to frictionally coact with the line to provide a brake for the reel with a pole supporting the reel disposed between said arms and normally gravitating to urge the reel toward the said arms and with the pole engaged by said holding member.

5. A device of the character described including a body portion, spaced arms mounted upon the body portion and curving rearwardly toward the inner end of the body portion in spaced relation thereto, and a holding member swingingly connected to the body portion, the said arms being adapted to engage a reel with a pole supporting the reel disposed between said arms and embraced by said holding member.

6. A device of the character described including a body portion, spaced arms carried thereby, and a holding member swingingly connected to the body portion and provided with spaced arms, the said first mentioned arms being adapted to engage a reel with a pole supporting the reel disposed therebetween and with the arms of the said holding member embracing the pole.

7. A device of the character described including a body portion provided with an attaching flange, a set screw adjustable upon the said flange to coöperate with the body portion, spaced arms carried by the body portion at the forward extremity thereof and curving inwardly over the body portion toward its rear extremity, and a substantially U-shaped holding member having its bight portion swingingly connected to the body portion, the said arms being adapted to engage a reel with a pole supporting the reel disposed therebetween and with the said U-shaped holding member embracing the handle of the pole.

In testimony whereof I affix my signature in presence of two witnesses.

JOHN H. PORTER. [L. S.]

Witnesses:
FRANK HUTCHISON,
CHARLES G. ISMON.